Aug. 2, 1938.  J. B. WHITTED  2,125,478
WINDSHIELD WIPER CONNECTION
Filed Oct. 7, 1933
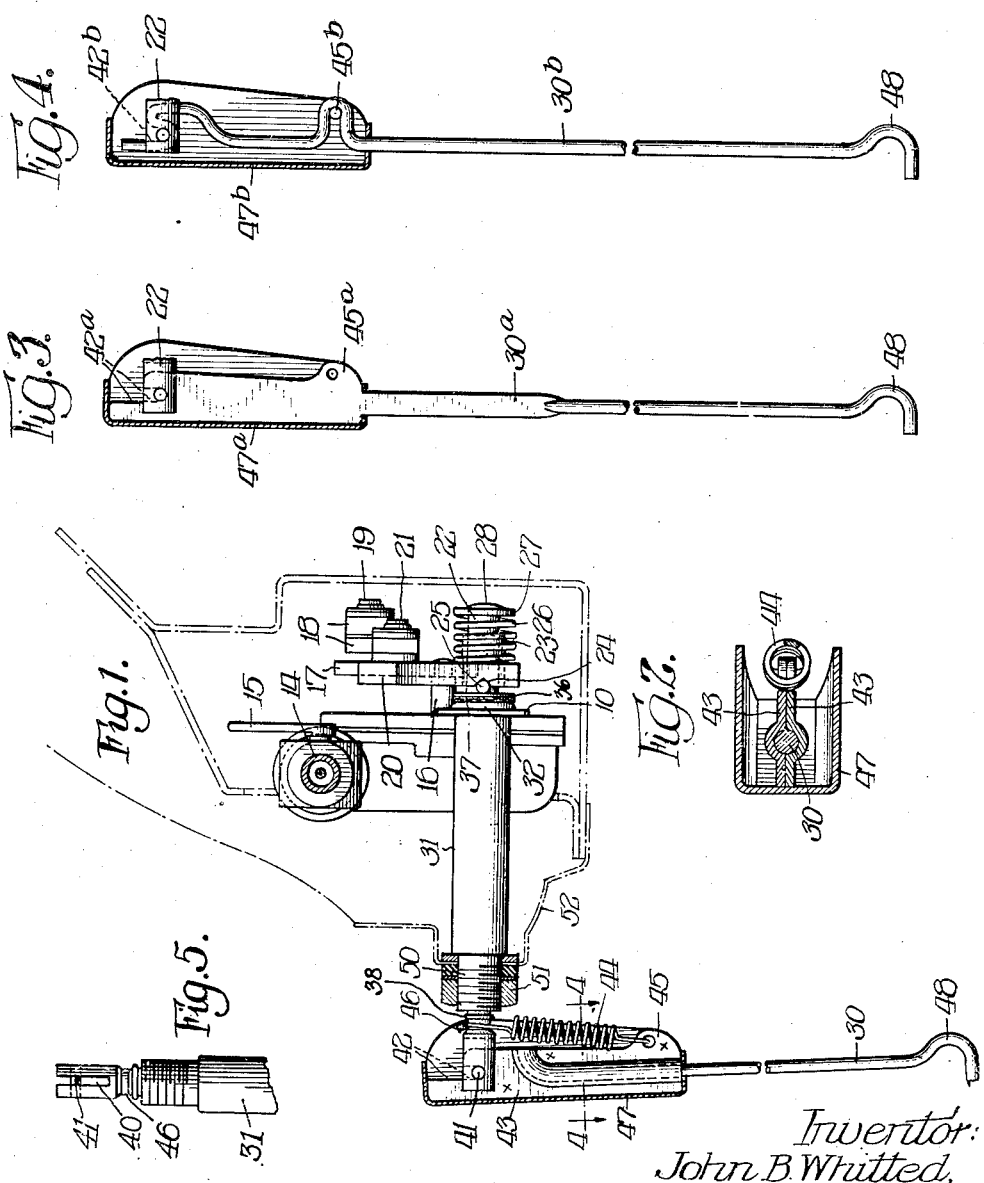
Inventor:
John B. Whitted, Patented Aug. 2, 1938

2,125,478

UNITED STATES PATENT OFFICE 2,125,478

WINDSHIELD WIPER CONNECTION

John B. Whitted, Evanston, Ill., assignor to Stewart-Warner Corporation, Chicago, Ill., a corporation of Virginia Application October 7, 1933, Serial No. 692,588

4 Claims. (Cl. 15—255)

My invention relates to an improvement in windshield wipers. More specifically it relates to an improvement in the connections between the wiper-holding arms and the operating shafts of the windshield wiper.

These connections must perform several functions. They must, of course, be capable of transmitting to the wiper-holding arms, the oscillatory movement of the operating mechanism, so that the wiper itself may be moved over the windshield. These connections must also hold the arm inwardly, with a yielding pressure, against the surface to be cleaned. In practice, this is usually accomplished by some form of spring means. Then, in order that the windshield may be opened, the wiper-holding arm must pivot on the shaft which is usually connected to some fixed part of the frame. This connection should also be made so that the wiper-holding arm may be detached easily from the shaft to facilitate the attachment and detachment of the wiper blade to the arm.

A difficulty of another sort arises when the arm is not straight, but bent, as occasionally it must be, for the purpose of allowing the operating mechanism to be fastened in a place otherwise desirable and still allowing the wiper to operate over the desired windshield surface. In such case there will be a torsion on the arm tending to twist the arm with reference to the shaft and this tendency must be overcome by the connections used.

Were these the only demands made of the connections, it would be easy to design them satisfactorily, but in actual use, windshield wipers are much abused, for example, by having the wiper blades pushed by hand from the outside of the car to various positions which make it easier to clean the windshield. Obviously, it is desirable, and often, necessary, to move or adjust wiper blades by hand, but if this is not done very carefully, the connections may be broken, or, if the connections are made heavy and strong, so they will not break, damage may result to the operating mechanism. This damage is especially likely in the case of wipers which are operated electrically or mechanically instead of by some form of air or vacuum motor, which, unlike the electrical or mechanical type, will yield to a hand pressure on the wiper blades.

An object of my invention is to provide connections between the wiper-holding arm and the driving shaft of a windshield wiper which will perform the above described normal functions of such connections, but which will be firm, strong, and steady, and yet will allow rough handling and free movement of the wiper arms without damage either to the connections or to the driving mechanism.

It is a particular object to provide connections of this kind, which are suitable for use where a plurality of wiper blades, all driven from a common motor, are used.

I aim to do this, moreover, by a structure which is of nice appearance and is as inexpensive to manufacture as is consistent with a strong and durable structure.

Further advantages and objects will appear as I describe my invention in this specification.

In general, to accomplish the desired results, I provide connections between the wiper-holding arm and the driving shaft by holding a bifurcated, or notched, upper end of the wiper-holding arm against a pin in a longitudinal slot in the driving shaft, by means of a tension spring.

A more thorough understanding of my invention may be had by one skilled in the art by reference to the drawing made a part of this application.

Figure 1 is an end elevation partially in section showing the connection of the driving means to a windshield wiper;

Figure 2 is a sectional view taken on the plane indicated 4—4 in Figure 1,

Figures 3 and 4 are detail views partially in section illustrating modified forms of the windshield wiper, and Figure 5 is a fragmentary plan view of the end of the wiper shaft.

In Figure 1 the general scheme of my invention is shown. Any suitable bracket 10 may be used to mount the windshield wiper at the edge (in this case, the upper edge) of the windshield. Fastened to this bracket is the operating mechanism, or motor (not shown) to which power is supplied through the flexible shaft 14 from the main engine of the vehicle. To start and stop the motor, a hand operated clutch may be provided and this I have shown at 15 in somewhat schematic fashion.

Pitmans 18 are pivoted on the crank 17 by the crank pin 19 to transmit motion from the crank arm 17 to wiper cranks 20 through their crank pins 21. The wiper cranks 20 each have a radius slightly greater than that of the driving crank 17 so that they will not rotate, as does the driving crank 29, but will oscillate. It is this oscillation which drives the wiper blades.

While I have thus indicated a simple and effective means of obtaining an oscillatory motion, this forms no part of my invention, which relates rather to the connections between some oscillating member, no matter how operated, and the wiper-holding arm. A description of these connections follows.

At their inner ends, the oscillating cranks 20 have bushings 23 of bronze, or the like, fitted into holes in the cranks formed to receive them tightly and hold them in place. These bushings form bearings so that the cranks 20 may turn with respect to the wiper shafts 22. To prevent this turning, except when desired, I provide a separate release clutch for each wiper shaft. Each clutch comprises a V notch 24, an engaging pin 25, which is driven into and through a hole in the wiper shaft, and a compression spring 26, which serves to hold the V notch on the wiper crank in registry with the engaging pin on the wiper crank. To form a seat for this compression spring I provide a head 27 fixed on the wiper shaft 22 by the riveted over end 28.

To transmit the motion from the wiper cranks 20 on the back, or inside, of the windshield to the wiper-holding arms 30 on the front, or outside, of the windshield, the shafts 22 pass through bearing tubes 31 which may be of any desired length to suit the length of the shafts. These tubes may be fastened to the bracket 10 by having a reduced portion 32 pass through a tight fitting hole in the bracket. This reduced portion leaves a shoulder which abuts the bracket 10 and on the other side of the bracket the reduced portion 32 is peened outwardly, thus firmly holding the bearing tube in place. At its outer end, the bearing tube is threaded as at 50 to receive a nut 51 suitable to secure the tube in position and seal it with respect to the portion of the auto body 52 through which the tube passes.

The shafts must be held against longitudinal movement in the bearing tubes. To do this, I provide, at the inner or crank end of the shafts, two washers, one 36 of steel and one 37 of compressed, oil-soaked felt. Near the other end of the shaft, where it emerges from the bearing tube, I provide a spring ring, or clip 38 which is seated in an annular groove in the shaft and which prevents inward movement of the shaft, the spring ring being of a diameter greater than the bore of the bearing tube.

To hold the wiper arms 30 I provide a slot 40 in the end of each wiper shaft. In one form of my invention, shown in Figures 1 and 2, I provide a pivot pin 41, which is driven through a tight fitting hole transversely of the shaft. The end of the wiper-holding arm is provided with a notch 42, which will engage this pivot pin. This notch is provided in two stamped members 43, which are fitted over the wiper-holding arm and are welded together at the points marked X. Between these stamped members, the arm itself is bent through an angle to provide against torsional movement between the arm and the stamped portions. In this form the arm is in the shape of a rod or wire. In another form, shown in Figure 3, the arm 30a may be a flat metal piece and have the notch 42a formed integrally in the upper end thereof. Or, as shown in Figure 4, a wire arm 30b may be bent so as to leave an indented portion 42b, which acts in the same way as the notch in the other form. In whatever form may be used, the notched portion of the arm is of a thickness to fit into the slot 40 of shaft 22.

To hold the wiper-holding arm in position in the slot against the pivot pin, a coiled tension spring 44 is provided. This spring is attached to a suitable hook-like projection 45 on the wiper-holding arm. In the other forms corresponding hooks are shown at 45a and 45b, respectively. At its opposite end, the spring is attached to the shaft by a loop which seats in an annular groove 46 in the shaft. If desired, a dust cap 47, 47a or 47b may be provided to shield the arm connections from dust, dirt, threads, etc., which might otherwise be caught in the projecting parts of the construction.

In whatever form my invention takes the arm is free to pivot through an arc with regard to the shaft, either on its pivot pin or on the arcuate portion of the slot as the case may be, and the spring urges the arm into position against the windshield. The provision of the slot holds the arm against any torsional movement. These firm connections enable the wiper blade, which is attached to the wiper-holding arm, in any suitable way, as by the hook construction 48, to be moved over the windshield positively and smoothly.

Nonetheless, because of the clutch I have provided in the connections of each wiper arm, the blades may be moved by hand independently one of another to any desired position. The operation of these clutches is quite simple. Under ordinary conditions the pin is held in the V groove by the pressure of the spring. This transmits the oscillatory movement of the wiper cranks to the shafts to operate the wiper. When a sudden or strong force is applied to the wiper blades or arms and the wiper cranks are held substantially fixed by the operating mechanism, the pins are lifted against the spring out of the V grooves by the camming action between the two, and the shafts are then freed to turn without moving the wiper cranks. When the pins and V grooves again come into registry, either by reason of movement of the wiper arms or of the shafts, the springs force them into engaging position and the clutches are ready again to transmit the normal operating movements of the cranks to the shafts.

I do not of course intend to limit myself to the specific preferred embodiments of my invention I have here described.

I claim:

1. In a windshield wiper, connections between a wiper bearing arm thereof, and a driving shaft therefor, comprising, a slot in the end of said shaft, a pin in the shaft and passing transversely through said slot, stamped members fastened to opposite sides of the upper end of said arm and having a common upper edge, a notch in said upper edge receiving said pin, a coiled tension spring fastened to said shaft inwardly from said pin, and to said arm downwardly from said notch.

2. In a windshield wiper, connections between a wiper bearing arm thereof and a driving shaft therefor comprising a slot in said shaft, spring means yieldingly urging the pivot end of said arm into said slot, pivot means in the slot, and cooperative pivot means comprising a notch on said arm facing toward the axis of the shaft and receiving the first mentioned pivot means whereby said arm may move in pivotal relation to said shaft.

3. In a windshield wiper, connections between a wire wiper bearing arm thereof and a driving shaft therefor, comprising, a slot in the end of said shaft, a pin in said shaft passing through said slot, said arm having a bent portion in said slot and receiving said pin in pivotal relation to said shaft, and spring means connected at one end to said shaft at a point inwardly spaced from said pin and connected at the other end to said arm at a point spaced from the bent portion thereof for holding said arm to said shaft in yielding pivotal relation thereto.

4. In a windshield wiper, a wiper shaft, a longitudinal slot in the end thereof, a pin in said shaft passing transversely through said slot, a wiper arm having a notch opening in the end face at the end of the arm adjacent the shaft, the notch extending toward the shaft and adapted for replaceable insertion in said slot in such a manner that the pin is received in the notch and the arm is held for movement received from motion of said shaft and spring means connected at one end to said shaft at a point inwardly spaced from said slot and connected at the other end to said arm at a point spaced from the notched end thereof, whereby said arm is drawn toward the shaft in pivotal bearing relation with said shaft.

JOHN B. WHITTED.